(12) United States Patent
Graffin

(10) Patent No.: US 8,770,967 B2
(45) Date of Patent: Jul. 8, 2014

(54) DEVICE FOR BLOW-MOLDING CONTAINERS

(75) Inventor: André Graffin, Winfield, IL (US)

(73) Assignee: Serac Group, La Ferte Bernard (FR)

( * ) Notice: Subject to any disclaimer, the term of this patent is extended or adjusted under 35 U.S.C. 154(b) by 120 days.

(21) Appl. No.: 13/343,310

(22) Filed: Jan. 4, 2012

(65) Prior Publication Data

US 2012/0177771 A1    Jul. 12, 2012

(30) Foreign Application Priority Data

Jan. 4, 2011   (FR) ...................................... 11 50048

(51) Int. Cl.
   *B29C 49/56*   (2006.01)
(52) U.S. Cl.
   USPC ......................................................... 425/541
(58) Field of Classification Search
   CPC ..................... B29C 2049/563; B29C 2049/566
   USPC .......................................... 425/529, 540, 541
   See application file for complete search history.

(56) References Cited

U.S. PATENT DOCUMENTS

| | | | |
|---|---|---|---|
| 3,829,264 A * | 8/1974 | Mnilk et al. .................... | 425/541 |
| 3,969,059 A * | 7/1976 | Michel ........................... | 425/541 |
| 5,411,391 A * | 5/1995 | Albrecht et al. ............... | 425/541 |
| 6,390,802 B1 * | 5/2002 | Zoppas ......................... | 425/540 |
| 7,004,745 B2 * | 2/2006 | Galloni ......................... | 425/540 |
| 7,048,531 B2 * | 5/2006 | Bianchini ...................... | 425/541 |
| 2009/0065980 A1 * | 3/2009 | Baumgarte et al. ........... | 425/526 |
| 2012/0225158 A1 * | 9/2012 | Voth et al. ..................... | 425/540 |

FOREIGN PATENT DOCUMENTS

| | | |
|---|---|---|
| DE | 202004017530 U1 | 3/2005 |
| DE | 102007022638 A1 | 11/2008 |
| WO | WO-2006111127 A2 | 10/2006 |

* cited by examiner

*Primary Examiner* — Robert B Davis
(74) *Attorney, Agent, or Firm* — Muncy, Geissler, Olds & Lowe, P.C.

(57) ABSTRACT

A device for blow-molding containers, the device comprising a structure and a platform mounted to rotate on the structure about an axis of rotation, the platform being provided with blower members and with molds that are mounted under the blower members, each of which comprises a stationary mold portion and a movable mold portion that is movable by control means between an open position and a closed position for the mold, wherein the device includes blocking members for blocking the molds in the closed state, each blocking member comprising a strut mounted on the platform to move between a retracted position and a blocking position.

8 Claims, 5 Drawing Sheets

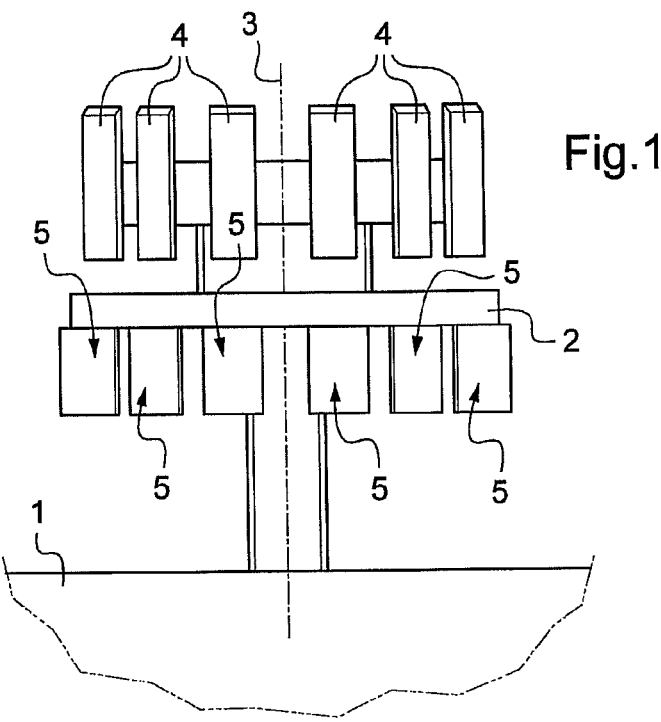
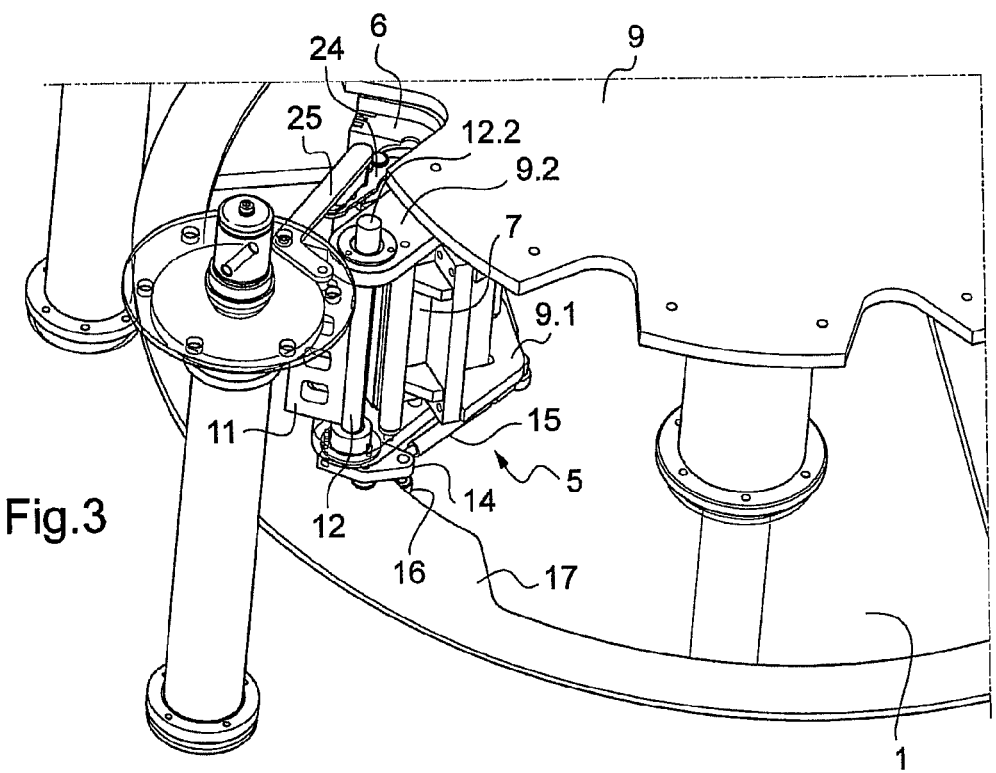

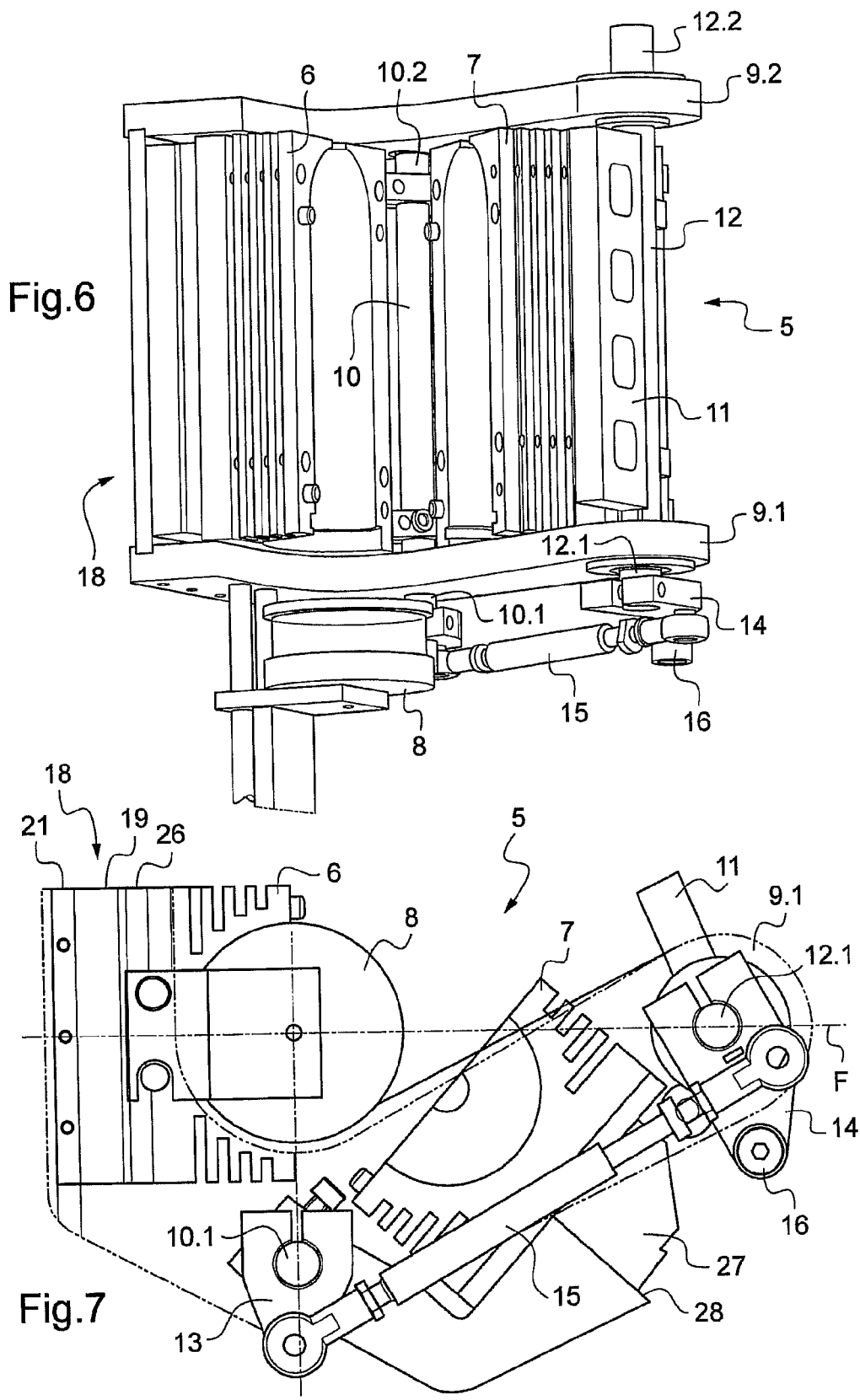

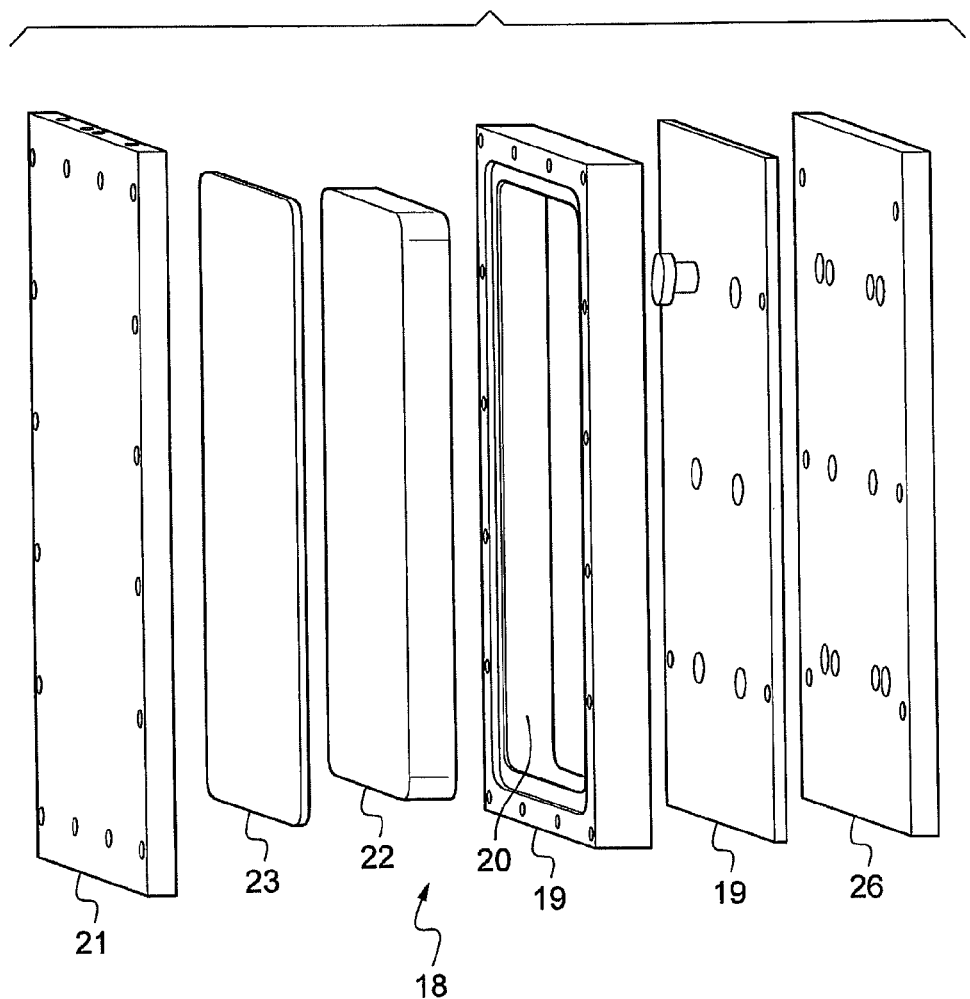

DEVICE FOR BLOW-MOLDING CONTAINERS

FIELD OF THE INVENTION

The present invention relates to a device for blow-molding containers. Such a device is generally designed to be installed in a line for producing packages that are intended in particular to contain liquids.

BACKGROUND OF THE INVENTION

A blow-molding device generally comprises a structure and a platform mounted to rotate on the structure about an axis of rotation. The platform is provided on its periphery with blower members and with molds mounted under the blower members. The device also includes control means for moving the molds between an open state and a closed state, a transporter for loading preforms into each of the molds, and a transporter for removing containers that have been blow-molded on the platform. Loading, blow-molding, and removal are performed in zones of the platform through which each mold passes in succession during the rotation of the platform. By way of example, the transporters comprise transfer stars and/or rectilinear transporters.

There exist molds that are constituted by two movable portions that are hinged to each other to move between a mold-open position and a mold-closed position. The mold is held in the closed position by means of a locking pin that is of dimensions suitable for co-operating with the hinge pin between the mold portions to withstand the blow-molding forces.

There also exist molds that comprise a stationary portion with a movable portion that is hinged thereto. The control means for moving the movable portion between the closed and open positions comprise two links connected to each other to form a toggle that also serves to hold the movable portion in its closed position.

Blow-molding is performed at a pressure of several tens of bars, conventionally forty bars, thereby giving rise to large forces on the molds, the hinges, and the mechanisms for holding the molds in the closed state. The molds and their holding mechanisms thus comprise parts that are bulky in order to withstand such forces. Nevertheless, the forces contribute to premature wear of the hinges of the movable portions of the molds and of the holding mechanisms, which wear makes it necessary to provide devices for taking up slack. The overall amount of wear is increased by the means for holding the mold in the closed position being complex and having a large number of hinges.

The complexity of the holding means therefore has an influence on maintenance costs and also contributes to the overall size and weight of the platform, thereby increasing its inertia.

OBJECT AND SUMMARY OF THE INVENTION

An object of the invention is to provide a device that is simpler and that presents a longer lifetime.

To this end, the invention provides a device for blow-molding containers, the device comprising a structure and a platform mounted to rotate on the structure about an axis of rotation, the platform being provided with blower members and with molds that are mounted under the blower members, each of which comprises a stationary mold portion and a movable mold portion that is movable by control means between an open position and a closed position for the mold, wherein the device includes blocking members for blocking the molds in the closed state, each blocking member comprising a strut mounted on the platform to move between a retracted position and a blocking position in which the strut extends between the movable mold portion and an abutment element secured to the platform and positioned in such a manner that the strut extends in a direction along which a resultant of the blow-molding force as taken up by the movable mold portion is applied.

Thus, the force for keeping the mold closed is taken up by the strut and by the abutment element that is positioned in such a manner that the strut and the abutment element are in alignment in the direction along which the resultant of the blow-molding forces taken up by the movable mold portion is applied. This enables a maximum amount of blow-molding force (and thus of force holding the mold closed) to be transmitted, and directed to the abutment element, which may then be dimensioned as a result of simple calculations. This also makes it possible to limit the forces that need to be withstood by the hinges of the stationary mold portions, thereby enabling their lifetime to be lengthened and the structure to be made lighter.

In a particular embodiment, the abutment element is a pivot shaft for pivoting the strut.

The pivot shaft of the strut works in shear, such that the forces that it must withstand are easily calculated, thereby making the pivot shaft simpler to dimension.

It is then preferable for the movable mold portion to be secured to a pivot shaft mounted on the platform to pivot between the closed and open positions, the control means including a connecting rod connecting together a crank secured to the pivot shaft of the movable mold portion and a crank secured to the pivot shaft of the strut and, advantageously, for the control means to comprise a wheel secured to one of the cranks in order to co-operate with a cam that is stationary relative to the structure and that is shaped to move the movable mold portion and the strut into their two positions.

The control means are then particularly simple and enable the movable mold portion and the strut to be moved in synchronized manner by means of a single control.

According to a particular characteristic, the mold portions and the strut are mounted in a frame that is fastened on the platform.

Thus, the frame serves to take up the blow-molding forces without them being transmitted to the platform.

By means of the frame, a mold module is likewise made up that incorporates the mold and its control means and that can be fitted as a unit on the platform. This enables mold changing to be accelerated when passing from fabricating a first series of containers to another series of containers having a different shape.

Advantageously, the strut is of a height that is substantially identical to the height of the mold.

The blow-molding force is thus taken up by the strut over the entire height of the stationary mold portion, thereby distributing the force in uniform manner and limiting any risk of stress concentration zones appearing, which would otherwise constitute sources of premature wear in the movable mold portion and/or the strut.

According to a particular characteristic, the stationary mold portion is mounted on a presser element for pressing the stationary mold portion against the movable mold portion and, preferably, the presser element comprises a body slidably receiving a piston in a chamber to slide in a direction parallel to the direction in which the resultant of the blow-molding force is applied, the piston being subjected to blow-molding pressure and the stationary mold portion being secured to move in translation with the piston.

The stationary mold portion is thus pressed against the movable mold portion and causes it to press firmly against the strut. This pressure is obtained in simple manner by means of the blow-molding pressure, it being understood that the piston is of a section such that the force that results from applying pressure thereto is at least greater than the blow-molding force acting on the mold.

BRIEF DESCRIPTION OF THE DRAWINGS

Other characteristics and advantages of the invention appear on reading the following description of a particular, non-limiting embodiment of the invention.

Reference is made to the accompanying drawings, in which:

FIG. 1 is a diagrammatic elevation view of a device in accordance with the invention;

FIG. 3 is a detail view of a zone III of FIG. 2;

FIG. 6 is a perspective view of a mold block in an open position;

FIG. 7 is a plan view of the mold block in the open position; and

FIG. 8 is an exploded diagrammatic view of means for pressing the stationary mold portion against the movable mold portion.

MORE DETAILED DESCRIPTION

Figure 2:
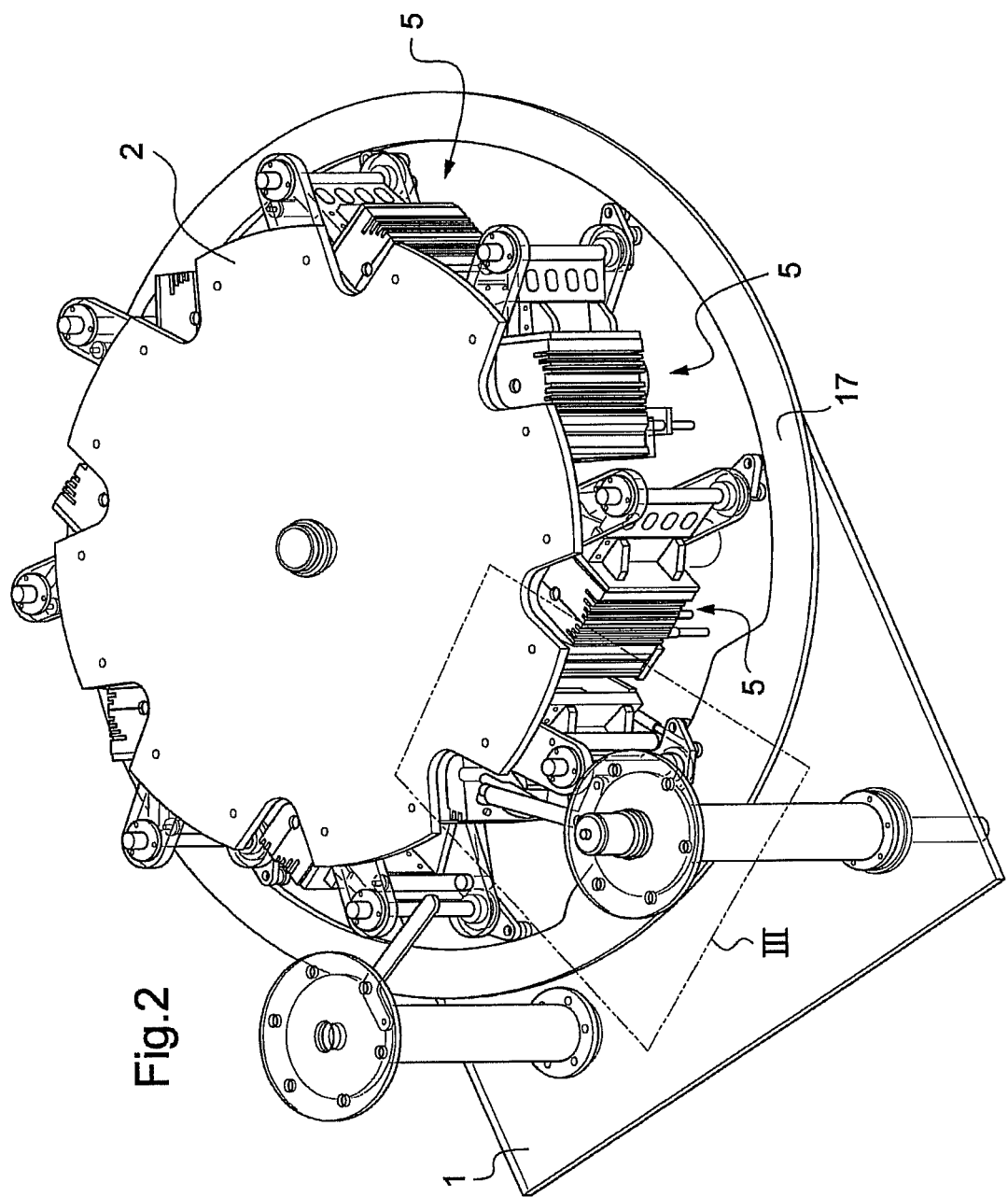
FIG. 2 is a fragmentary diagrammatic view in perspective of the platform of the device.

The device for blow-molding containers in this example is for fabricating bottles with threaded necks. The bottles are fabricated from preforms that are inserted into molds prior to air being blown into the insides of the preforms in order to inflate them and form the bodies of bottles by pressing the preforms against the walls of the molds. The blow-molding method is itself known and is not described in greater detail herein.

With reference to the figures, the device of the invention comprises a structure 1 and a platform 2 mounted to rotate on the structure 1 about an axis of rotation 3.

The platform 2 is provided with blower members 4 that are themselves known and with molds given overall reference 5 that are mounted beneath the blower members 4.

Each mold 5 comprises two mold portions, namely a stationary mold portion 6 and a movable mold portion 7 together with a bottom 8. Each mold portion 6, 7 includes a cavity corresponding to half of the outside shape of the body of the bottle, the bottom 8 including a cavity corresponding to the bottom of the bottle.

The mold portions 6, 7 are mounted between a bottom plate 9.1 and a top plate 9.2 forming a frame, and the bottom 8 is mounted under the bottom plate 9.1.

The movable mold portion 7 is provided with reinforcement 27 having one side secured to a shaft 10 having bottom and top end portions 10.1 and 10.2 pivotally received in the plates 9.1 and 9.2, respectively. The movable mold portion 7 thus pivots between a closed position (FIGS. 4 and 5) in which it extends facing the stationary mold portion 6, and an open position (FIGS. 6 and 7) in which it is spaced apart from the stationary mold portion 6 so as to enable the preform to be inserted into the mold 5 and so as to enable the blow-molded bottle to be extracted from the mold 5.

Figure 4:
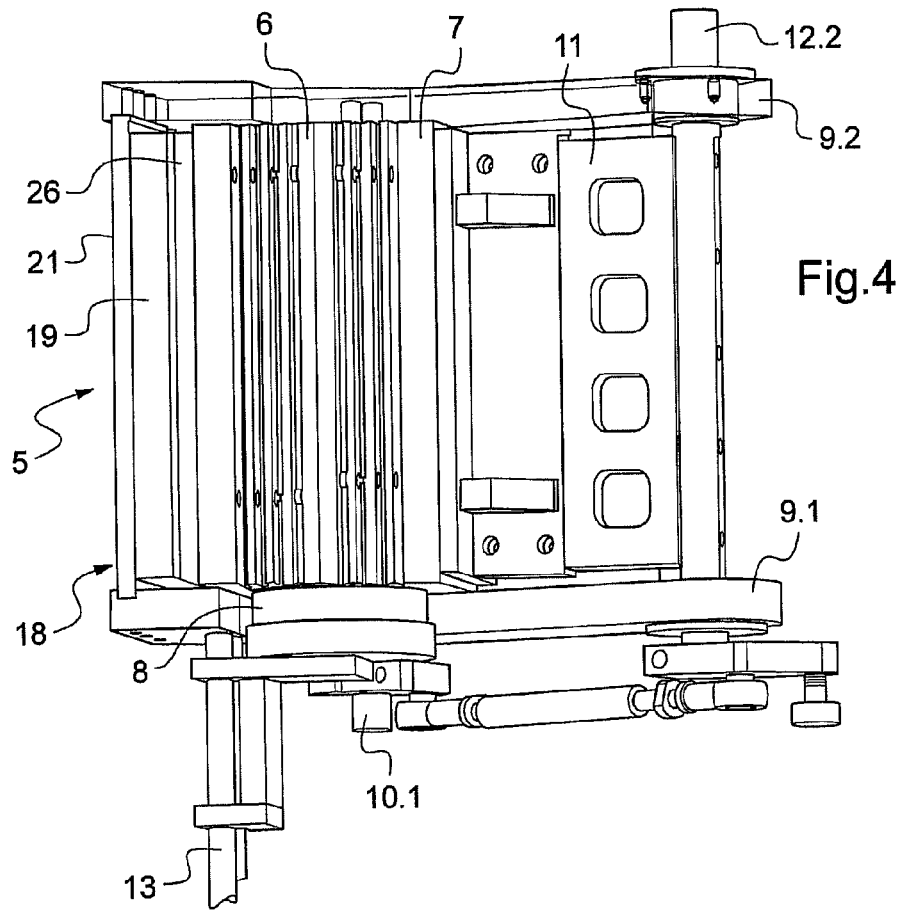
FIG. 4 is a perspective view of a mold block in a closed position.
Figure 5:
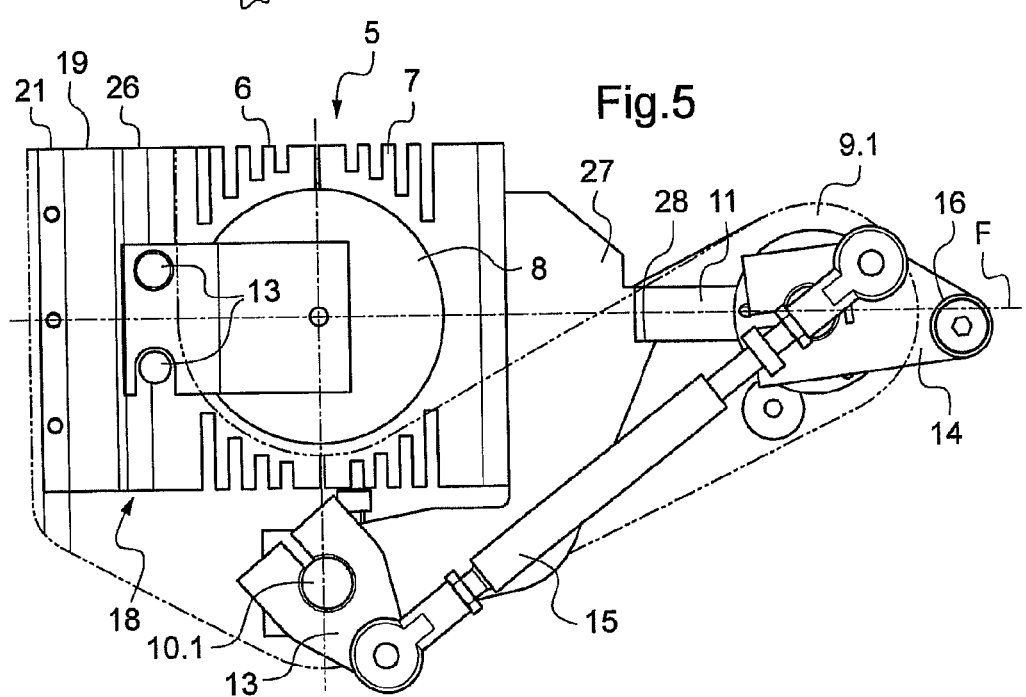
FIG. 5 is a plan view of the mold block in the closed position.

The movable mold portion 7 is associated with a member for blocking it in the closed position. The blocking member comprises a strut 11 having one end secured to a pivot shaft 12 presenting a bottom end portion 12.1 and a top end portion 12.2 that are pivotally received in the bottom plate 9.1 and in the top plate 9.2, respectively. The strut 11 is thus movable between a retracted position (FIGS. 6 and 7) and a blocking position (FIGS. 4 and 5). In the blocking position, the strut 11 extends between the movable mold portion 7 and the pivot shaft 12 that forms an abutment element secured to the platform 2 in a position such that the strut 11 in the blocking position extends along a direction F (FIG. 5) for applying a resultant of the blow-molding force taken up by the movable mold portion 7. In the retracted position, the strut 11 extends outwards from the platform 2 in a substantially radial direction relative to said platform 2. The strut 11 is thus of a height that is substantially equal to the height of the movable mold portion 7. It should be observed that the reinforcement 27 is arranged so as to enable the strut 11 to bear thereagainst and so as to enable it to take up the blow-molding forces. The reinforcement 27 includes an abutment 28 for stopping pivoting of the strut 11 in its blocking position.

The bottom 8 is mounted on columns 13 to slide vertically between a closed or high position in which the bottom 8 has a fraction bearing against the mold portions 6 and 7 when the movable mold portion 7 is closed (FIGS. 4 and 5), and an open or low position (FIGS. 6 and 7) in which the bottom 8 is spaced apart from the mold portions 6 and 7. When the bottom 8 is in the closed position and the movable mold portion 7 is in the closed position, the bottom 8 has its top edge held captive between the mold portions 6 and 7 (shown more clearly in FIG. 4).

The platform 2 is provided with control means for controlling the movable mold portions 7 to move between their closed and open positions, and control means for controlling the struts 11 to move between their retracted and their blocking positions.

For each movable mold portion 7 and each associated strut 11, the control means comprise cranks 13 and 14 fastened respectively to the ends 10.1 and 12.1 of the shafts 10 and 12, and connected to each other by a connecting rod 15. The connecting rod 15 serves to synchronize the movements of the strut 11 between its retracted position and its blocking position with the movements of the movable mold portion 7 between its open position and its closed position in such a manner that when the movable mold portion 7 is taken towards its closed position, the strut 11 is taken towards its blocking position, and when the movable mold portion 7 is taken towards its open position, the strut 11 is taken towards its retracted position. The crank 14 is also provided with a wheel 16 that co-operates with a cam 17 fastened to the structure 1 and extending around the platform 2 so as to move the crank 14 and thus the crank 13 via the connecting rod 15 into their positions that correspond to the retracted and blocking positions of the strut 11, and thus to the open and closed positions of the movable mold portion 7. The cam 17 is arranged to open the molds in a zone for loading preforms into the molds 5 and for unloading blow-molded bottles from the molds 5, and to close the molds 5 and keep them closed when, as a result of the platform 2 rotating, the molds 5 are no longer in the loading and unloading zone.

The platform 2 is provided with control means for controlling movement of the bottom 8 between its open position and its closed position. The bottom 8 is provided with a wheel (not shown in the figures) that co-operates with a cam (not shown in the figures) that is fastened to the structure 1 and that extends around the platform 2 to move the bottom 8 between its open position and closed positions.

The stationary mold portion 6 is mounted on a presser element given overall reference 18 for pressing the stationary mold portion 6 against the movable mold portion 7. This presser element 18 comprises a body 19 defining a chamber 20 that is closed at one end by an end wall 21 and that slidably receives a piston 22 having a fastener plate 26 fastened thereto for fastening to the stationary mold portion 6. The sliding direction of the piston 22 is parallel to the direction in which the resultant of the blow-molding force is applied, and the stationary mold portion 6 is constrained to move in translation with the piston 22. The end wall 21 has top and bottom edges received in grooves that are formed in the top and bottom plates 9.2 and 9.1. Between the body 19 and the end wall 21 there extends an elastically deformable diaphragm 23 having a peripheral edge that is pinched between the body 19 and the end wall 21. The end wall 21 is pierced by a channel for injecting air at the blow-molding pressure between the end wall 21 and the diaphragm 23 in such a manner that the air causes the diaphragm 23 and the piston 22 to move, and thus moves the stationary mold portion 6. The air injection channel is connected by a duct to the source of blow-molding air that feeds each of the blower members 4.

In operation, with the platform 2 rotating, the mold 5 is open in register with a member for putting a preform in the mold 5, and then once the preform has been loaded into the mold 5, the cam 17 causes the mold 5 to close by bringing the movable mold portion 7 into the closed position and bringing the strut 11 into its blocking position. The control means for controlling the movement of the movable mold portion 7 between the open state and the closed state, are naturally synchronized with the control means for moving the bottoms 8 between their open positions and their closed positions.

Blow-molding air is then introduced into the mold 5 and simultaneously between the diaphragm 23 and the end wall 21. The blow-molding air then causes the following:
  the piston 22 to move so as to press the stationary mold portion 6 against the movable mold portion 7 that is blocked in position by the strut 11; and
  the preform to be inflated so that its wall becomes pressed against the inside wall of the mold 5.

It should be observed that the stroke of the piston 22 is small since the function of the piston 22 is to eliminate clearance between the stationary mold portion 6 and the movable mold portion 7, and also between the movable mold portion 7 and the strut 11.

Blow-molding terminates when the mold 5 returns to the loading and unloading zone. The blow-molding pressure is disconnected beforehand. The cam 17 then causes the strut 11 to retract and the mold 5 to open. A clamp 24 mounted at the end of an arm 25 then takes hold of the blow-molded bottle. The arm 25 is guided to cause the clamp 24 to move in an extraction direction enabling the blow-molded bottle to be taken out from the open mold 5 without interfering with the movable mold portion 7. The extraction movement is thus performed in a direction going away from the movable mold portion 7.

Naturally, the invention is not limited to the embodiments described, but covers any variant coming within the ambit of the invention as defined by the claims.

In particular, the means for moving the struts between their two positions may comprise a servo-motor instead of a cam.

Furthermore, the means for causing the molds to move between their open and closed states may comprise one or more servo-motors instead of cams.

The control means for the struts and for the movable mold portions may be independent of one another.

The mold may comprise only a stationary portion and a movable portion.

The mold portions may be fastened directly to the platform.

The strut may slide between its two positions and it may be received in its blocking position between the movable mold portion and an abutment element secured to the platform or to a member that is itself secured to the platform.

The strut may thus bear against the movable mold portion either directly or indirectly, i.e. via an intermediate part.

The bottom 8 may tilt between its two positions instead of sliding between said positions.

What is claimed is:

1. A device for blow-molding containers, the device comprising a structure and a platform mounted to rotate on the structure about an axis of rotation, the platform being provided with blower members and with molds that are mounted under the blower members, each of which comprises a stationary mold portion and a movable mold portion that is movable by control means between an open position and a closed position for the mold, wherein the device includes blocking members for blocking the molds in the closed state, each blocking member comprising a strut mounted on the platform to move between a retracted position and a blocking position in which the strut extends between the movable mold portion and an abutment element secured to the platform and positioned in such a manner that the strut extends in a direction along which a resultant of the blow-molding force as taken up by the movable mold portion is applied.

2. A device according to claim 1, wherein the abutment element is a pivot shaft for pivoting the strut.

3. A device according to claim 2, wherein the movable mold portion is secured to a pivot shaft mounted on the platform to pivot between the closed and open positions, the control means including a connecting rod connecting together a crank secured to the pivot shaft of the movable mold portion and a crank secured to the pivot shaft of the strut.

4. A device according to claim 3, wherein the control means comprise a wheel secured to one of the cranks in order to co-operate with a cam that is stationary relative to the structure and that is shaped to move the movable mold portion and the strut into their two positions.

5. A device according to claim 1, wherein the mold portions and the strut are mounted in a frame that is fastened on the platform.

6. A device according to claim 1, wherein the strut is of a height that is substantially identical to the height of the mold.

7. A device according to claim 5, wherein the stationary mold portion is mounted on a presser element for pressing the stationary mold portion against the movable mold portion.

8. A device according to claim 7, wherein the presser element comprises a body slidably receiving a piston in a chamber to slide in a direction parallel to the direction in which the resultant of the blow-molding force is applied, the piston being subjected to blow-molding pressure and the stationary mold portion being secured to move in translation with the piston.

* * * * *